United States Patent [19]

Ishigo et al.

[11] Patent Number: 4,471,393
[45] Date of Patent: Sep. 11, 1984

[54] TAPE RECORDER

[75] Inventors: Hideyasu Ishigo; Minoru Nishizono, both of Yokohama, Japan

[73] Assignee: Tokyo Shibaura Denki Kabushiki Kaisha, Kawasaki, Japan

[21] Appl. No.: 356,807

[22] Filed: Mar. 10, 1982

[30] Foreign Application Priority Data

Mar. 16, 1981 [JP] Japan .................................. 56-37714

[51] Int. Cl.³ .................... G11B 5/008; G11B 15/00; G11B 15/32
[52] U.S. Cl. ..................................... 360/90; 242/201
[58] Field of Search ............... 360/90, 92, 93, 96, 360/73, 71, 74.2, 74.5, 112, 105; 242/201, 202, 203, 208, 210; 226/50

[56] References Cited

U.S. PATENT DOCUMENTS

| | | | |
|---|---|---|---|
| 4,279,006 | 7/1981 | Sasaki | 242/203 |
| 4,313,142 | 1/1982 | Ochida | 360/105 |
| 4,337,488 | 6/1982 | Osanai | 360/90 |
| 4,346,414 | 8/1982 | Osanai | 242/201 |
| 4,358,800 | 11/1982 | Shimizu | 360/90 |

*Primary Examiner*—Robert Martin Kilgore

*Attorney, Agent, or Firm*—Cushman, Darby and Cushman

[57] ABSTRACT

A tape recorder which comprises; a capstan for driving a magnetic recording tape at a normal constant speed; a first motor for rotating the capstan, including a first rotor magnet, a first rotating shaft mounted to the first rotor magnet and the capstan coaxially, and a first stator coil for applying a rotating magnetic field to the first rotor magnet; a first reel for taking up the tape; a second motor for rotating the first reel, including a second rotor magnet, a second rotating shaft mounted to the second rotor magnet and the first reel coaxially, and a second stator coil for applying a rotating magnetic field to the second rotor magnet; a second reel for supplying the tape; a third motor for rotating the second reel, including a third rotor magnet, a third rotating shaft mounted to the third rotor magnet and the second reel coaxially, and a third stator coil for applying a rotating magnetic field to the third rotor magnet; an FG pattern for producing a signal which has a frequency in accordance with a rotational frequency of the first rotor magnet; an output mechanism for producing a signal which has a reference frequency; and a comparator for comparating outputs from the FG pattern and the output mechanism and for controlling to drive the first motor at a predetermined rotational frequency.

27 Claims, 39 Drawing Figures

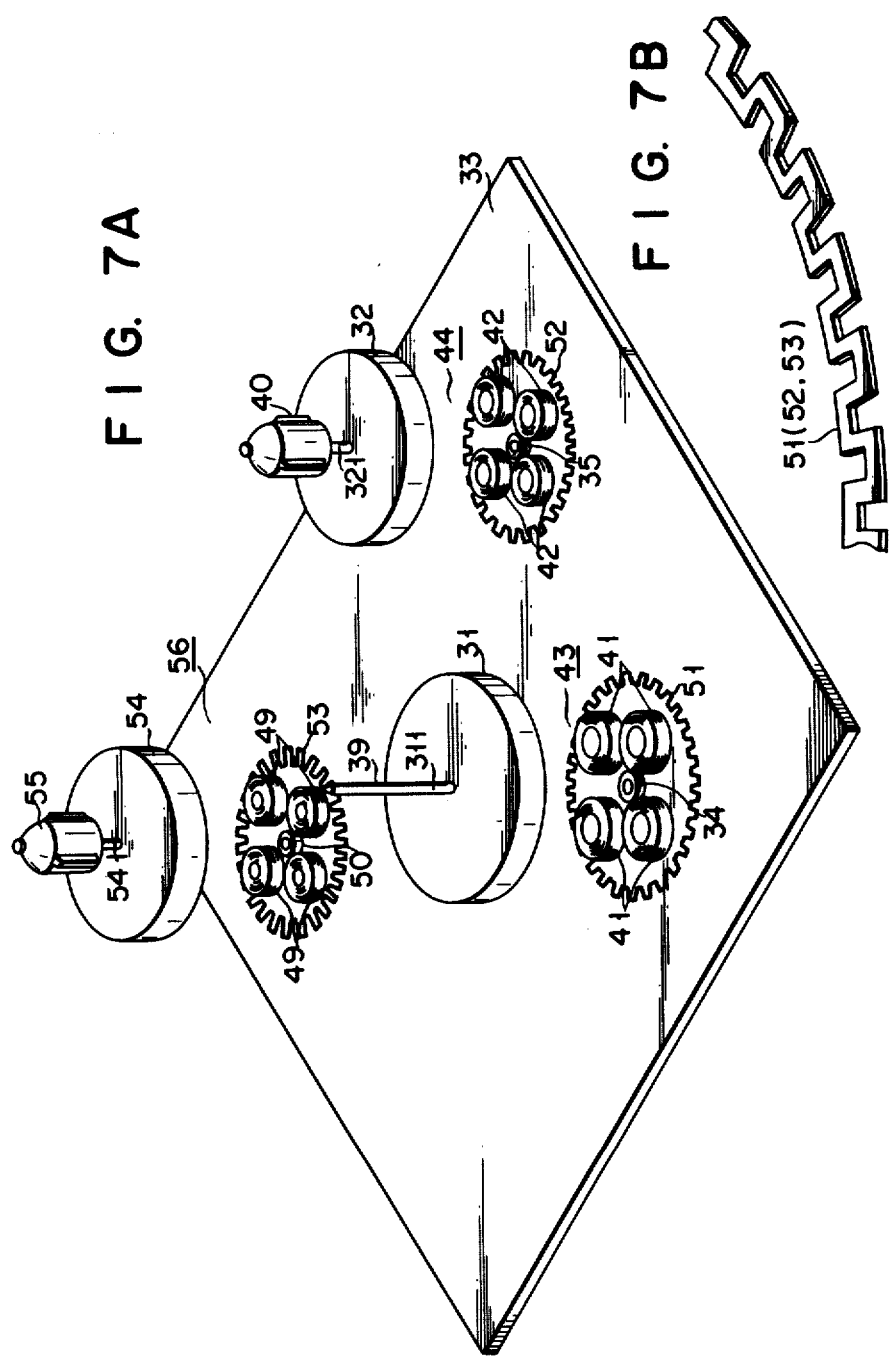

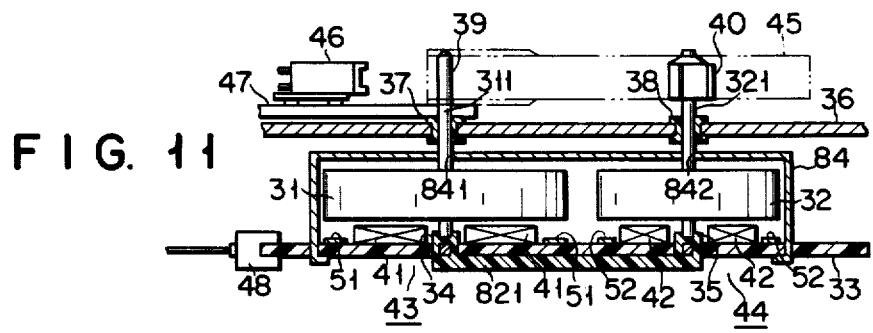
F I G. 11
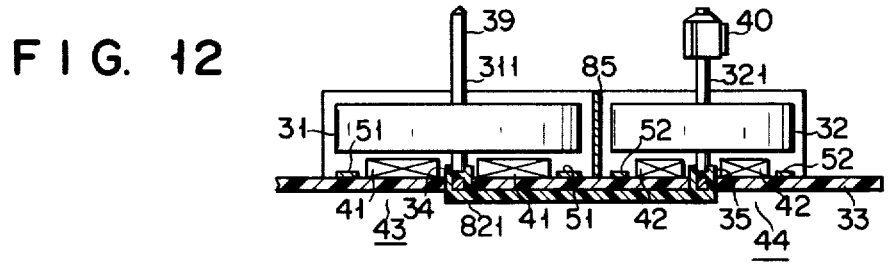
F I G. 12
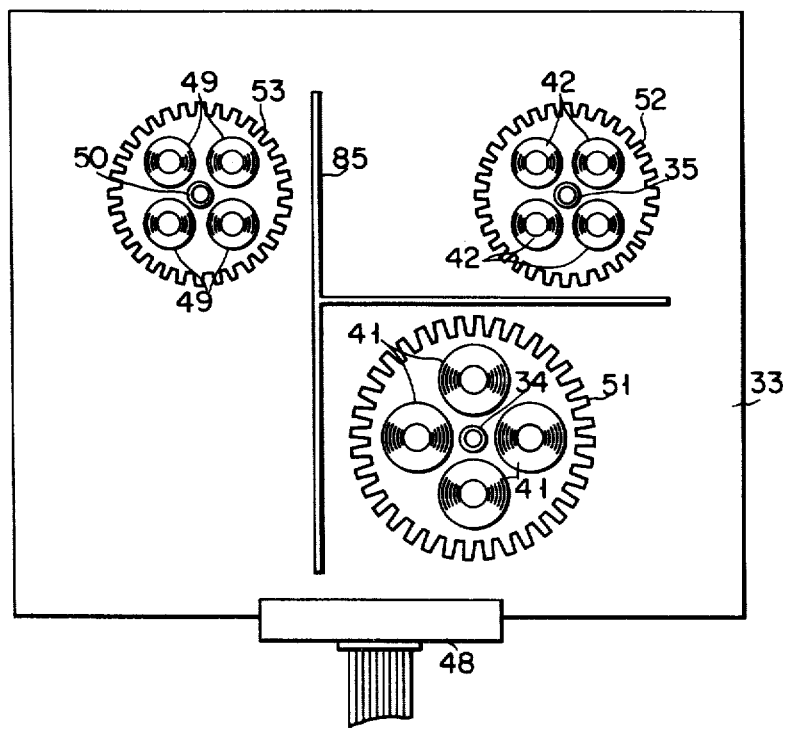
F I G. 13

TAPE RECORDER

BACKGROUND OF THE INVENTION

The present invention relates to a tape recorder and, more particularly, to a tape recorder with a direct drive system.

In conventional tape recorders, a pair of reel shafts, a flywheel (capstan) and the like are driven by one drive motor through a rotation transmitting mechanism consisting of a belt, a pulley, an idler and the like. Thus, the magnetic recording tape is driven. However, in the conventional tape driving means, the number of component parts is great and the structure thereof is complicated, resulting in manufacturing difficulties. Therefore, in a tape recorder having such a tape driving means, various kinds of problems such as large in size and heavy in weight are presented. Further, the sound quality may not be improved. Since the rotation transmitting mechanism operates through the intermediary of the drive motor, the reel shafts and the flywheel (capstan), the rotational force is decreased. Therefore, especially, wow and flutter cannot be greatly decreased. Because of this, the typical arrangement of a conventional tape recorder prevents the improvement of sound quality.

A tape recorder with a direct drive (DD) system has been recently developed. In a direct drive system, the pair of reel shafts and the rotating shaft (also used as the capstan) of the flywheel are directly coupled with rotors of the motors, respectively. When the reel shafts and the flywheel (or capstan) of the tape recorder are directly driven by the direct drive system, the rotation transmitting mechanism such as the conventional belt, pulley, idler and the like are eliminated. Therefore, such a tape recorder may be simple in construction, light in weight, compact in size, and may be manufactured easily. Further, wow and flutter can be greatly decreased, improving sound quality. The switching operations for the rotational frequency, the rotational direction and the like are all electrically controlled. In addition to simple construction, soft touch buttons may be adopted. Thus, this kind of tape recorder may provide other advantages.

However, tape recorders with a direct drive system which are currently commercially available are being developed. Although the above advantages can be theoretically attributed to a tape recorder with a direct drive system, these advantages cannot be fully realized in practice. Therefore, various modifications and improvements in details are desired.

SUMMARY OF THE INVENTION

The present invention was contrived in consideration of the above mentioned circumstances and has as its object to provide a tape recorder which is compact in size, light in weight, stable in operation, and which is easily manu- factured.

According to an aspect of the present invention, there is provided a tape recorder which comprises a first rotating body for driving a magnetic recording tape at a normal constant speed; first driving means for driving the first rotating body about a rotational central axis, the first driving means including a first motor having a first rotor magnet which is rotatably disposed, a first rotating shaft mounted at a rotational center of the first rotor magnet and having a rotational central axis which coincides with the rotational central axis of the first rotating body, and a first stator coil for applying a rotating magnetic field to the first rotor magnet; a second rotating body for taking up the magnetic recording tape; second driving means for driving the second rotating body about a rotational central axis; a third rotating body for supplying the magnetic recording tape; and third driving means for driving the third rotating body about a rotational central axis, wherein the first driving means includes first output means for producing a signal which has a frequency in accordance with a rotational frequency of the first rotor magnet, second output means for producing a signal which has a reference frequency and control means for comparing outputs from the first and second output means and for controlling to drive the first motor at a predetermined rotational frequency; the second driving means includes a second motor having a second rotor magnet which is rotatably disposed, a second rotating shaft mounted at a rotational center of the second rotor magnet and having a rotational central axis which coincides with the rotational central axis of the second rotating body, and a second stator coil for applying a rotating magnetic field to the second rotor magnet; and the third driving means includes a third motor having a third rotor magnet which is rotatably mounted, a third rotating shaft mounted at a rotational center of said third rotor magnet and having a rotational central axis which coincides with the rotational central axis of the third rotor magnet, and a third stator coil for applying a rotating magnetic field to the third rotor magnet.

BRIEF DESCRIPTION OF THE DRAWINGS

FIGS. 6 and 7A are a plan view and a perspective view of the tape recorder shown in FIG. 5;

FIG. 7B is an enlarged perspective view of an FG pattern;

FIG. 11 is a cross-sectional view of a modification of the second ebodiment shown in FIG. 10;

FIGS. 12 and 13 are a cross-sectional view and a plan view, respectively, of a tape recorder according to a third embodiment of the present invention;

DETAILED DESCRIPTION OF THE PREFERRED EMBODIMENTS

Figure 1A:
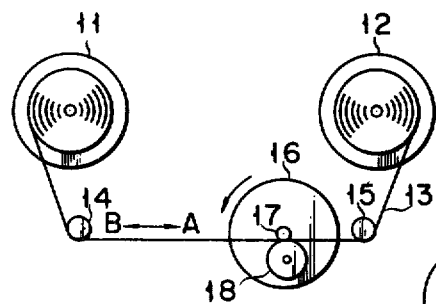
FIGS. 1A to 1C are plan views schematically illustrating the different tape driving mechanisms, respectively, for a tape recorder according to the present invention.
Figure 1B:
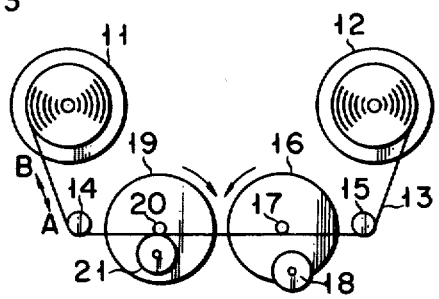
Figure 1C:
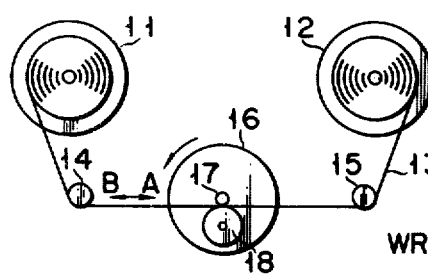

Prior to the description of a tape recorder of a first embodiment of the present invention, types of tape driving mechanisms of the tape recorder and the driving principle of a motor used in a direct drive system will be briefly described. Mainly, three different types of tape driving mechanisms are presented as shown in FIGS. 1A to 1C, respectively. FIG. 1A shows a general tape driving mechanism. In this mechanism, a magnetic recording tape 13 both ends of which are wound at a pair of reel tables 11 and 12 can be driven in both directions indicated by arrows A and B in the figure through a pair of guide rollers 14 and 15. When the magnetic recording tape 13 travels at the normal speed, the magnetic recording tape 13 is clamped between a pinch roller 18 and a capstan 17 which is coaxial with a flywheel 16 between the guide rollers 14 and 15. Thus, the magnetic recording tape 13 travels along the direction indicated by arrow A, that is, along the counterclockwise direction by the rotation of the capstan 17 at the normal speed.

FIG. 1B shows a tape driving mechanism with a dual capstan system. This tape driving mechanism comprises two flywheels 16 and 19, capstans 17 and 20 which are coaxial with the flywheels 16 and 19, respectively, and pinch rollers 18 and 21 which come into tight contact with the capstans 17 and 20, respectively. These parts are all situated between both guide roller 14 and 15. When one pinch roller is in contact with its corresponding capstan, the other pinch roller is not in contact with its corresponding capstan. This dual capstan system is especially adopted in a tape recorder which has an automatic reverse function. The magnetic recording tape 13 is clamped between the capstan 17 and the pinch roller 18 or between the capstan 20 and the pinch roller 21 and selectively driven at the normal speed in the counterclockwise direction by the rotation of the capstan 17, that is, in the direction indicated by the arrow A or in the clockwise direction by the rotation of the capstan 20, that is, in the direction indicated by the arrow B.

Further, FIG. 1C shows a tape driving mechanism of a center capstan system. This tape driving mechanism comprises the flywheel 16 disposed substantially at the center between the guide rollers 14 and 15, the capstan 17 coaxially disposed with the flywheel 16, and the pinch roller 18 which comes into tight contact with the capstan 17. The center capstan system is especially adopted for a microcassette tape recorder. The magnetic recording tape 13 is clamped between the capstan 17 and the pinch roller 18 and driven at the normal speed in the counterclockwise direction by the rotation of the capstan 17, that is, in the direction indicated by the arrow A.

The driving principle of operation of a motor for the direct drive system will be described. This motor has a rotor magnet 22 of substantially a disc shape and of a certain thickness as shown in FIG. 2A. The lower end of a rotating shaft 221 of the rotor magnet 22 is rotatably supported by a bearing 24 mounted on a printed circuit board 23. The upper end of the rotating shaft 21 is rotatably supported to extend through a bearing 26 mounted to a base plate 25 for placing the magnetic recording tape 13 of the tape recorder thereon. The upper end of the rotating shaft 221 extends upward from the base plate 25. This extended portion serves as the capstan. Or, the reel table is mounted on the extended portion.

Figure 2B:
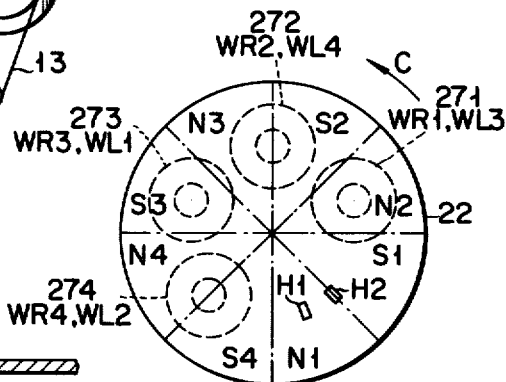
FIGS. 2A and 2B are a sectional view and a plan view, respectively, of a motor of a direct drive system.
Figure 2A:
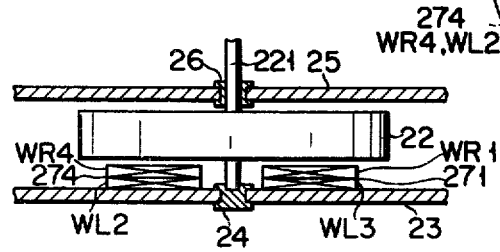

An S pole and an N pole are alternately formed around the rotational axis on the lower surface of the rotor magnet 22, as shown in FIG. 2B. In this figure, four N pole portions N1 to N4 and four S pole portions S1 to S4 are formed. Four stator cores 271 to 274 are disposed on those parts of the printed circuit board 23 which are opposing the magnetic pole surfaces of the rotor magnet 22, in the positional relation shown in FIG. 2B. The stator cores 271 to 274, comprises two coils each WR1 and WL3, WR2 and WL4, WR3 and WL1 and WR4 and WL2, respectively. One of the coils is wound in one direction and the other coil is wound in the other direction to form an integrated coil in the axial direction. The coils WR1 to WR4 are wound in one direction and the coils WL1 to WL4 are wound in the other direction. Two Hall elements H1 and H2 are disposed on the upper surface of the printed circuit board 23 in a positional relation shown in FIG. 2B.

Figure 3:
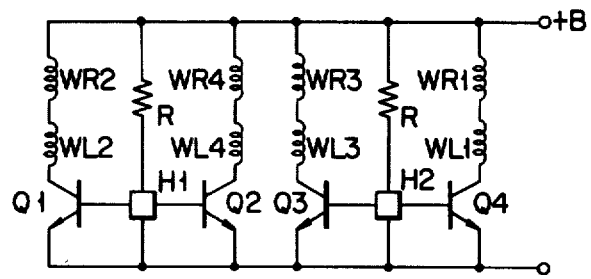
FIG. 3 is an equivalent circuit diagram of the motor shown in FIGS. 2A and 2B.

The coils WR1 to WR4 and WL1 to WL4 and the Hall elements H1 and H2 are connected as shown in FIG. 3. In this equivalent circuit, when the magnetic field generated by the N pole or the S pole is applied to the Hall element H1, the Hall element H1 generates an output to render transistor Q1 or Q2 conductive. And, when the magnetic field generated by the N pole or the S pole is applied to the Hall element H2, the Hall element H2 generates an output to render transistor Q3 or Q4 conductive.

Figure 4A:
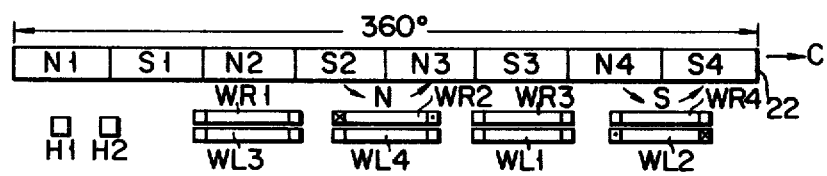
FIGS. 4A to 4D are schematic side views for explaining different operating conditions of a rotor magnet which is illustratively developed in the rotational direction in order to explain the principle of operation of a motor.
Figure 4B:
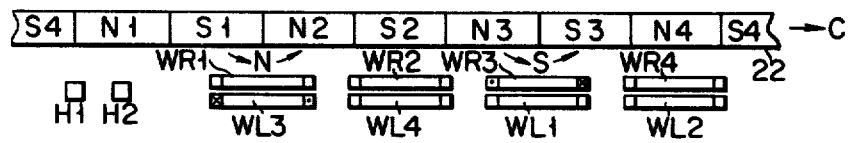

FIGS. 4A to 4D are developed plan views for explaining the positional relations among the rotor magnet 22, the coils WR1 to WR4 and WL1 to WL4 and the Hall elements H1 and H2, for convenience sake. The driving process will be described with reference to these figures. As shown in FIG. 4A, when the Hall element H1 opposes a magnetic pole N1 of the rotor magnet 22, the Hall element H1 is activated by the N pole so as to turn on a transistor Q1. A current flows in the coils WR2 and WL2 in the direction indicated in FIG. 4A. Symbol ⊗ here indicates the normal direction toward the plane of the drawing and symbol ⊙ indicates the normal direction from the plane of the drawing. Therefore, magnetic fields of N and S poles are generated by the coils WR2 and WL2, respectively. Rotational driving force indicated by the arrows in the figure is generated between the magnetic fields of the N and S poles generated by the coils WR2 and WL2 and the magnetic fields of the magnetic poles of the rotor magnet 22. The rotor magnet 22 starts rotating in the direction indicated by the arrow C (also shown in FIG. 2B).

When the rotor magnet 22 rotates and then the Hall element H2 opposes the magnetic pole N1 of the rotor magnet 22, a transistor Q3 is rendered conductive. Therefore, a current is applied to coils WR3 and WL3 in the direction shown in FIG. 4B. Magnetic fields of the N and S poles are, respectively, generated at the coils WR3 and WL3. Thus, the rotor magnet 22 further rotates in the direction indicated by the arrow C.

Figure 4C:
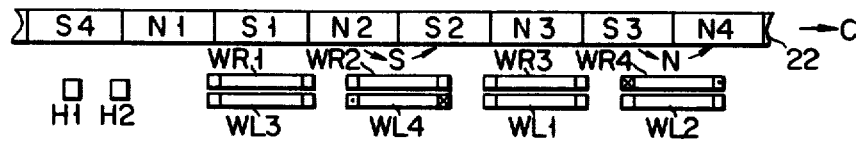
Figure 4D:
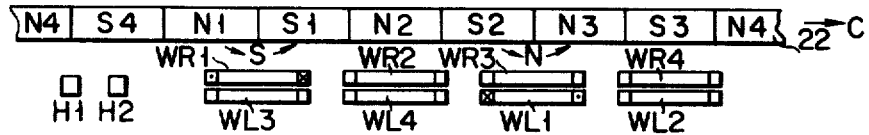

Similarly, as shown in FIGS. 4C and 4D, the rotational driving force is generated and the rotor magnet 22 is continuously rotated. In the motor with the above structure, the rotational direction and the rotational frequency of the rotor magnet 22 can be arbitrarily controlled by the turn direction of the coils WR1 to WR4 and WL1 to WL4 and the amount of the current applied thereto.

A tape recorder according to a first embodiment of the present invention will be described with reference to the accompanying drawings. In the following description, a tape recorder with the direct drive system shown in FIG. 1A is described unless otherwise specified. The Hall elements H1 and H2 shown in FIGS. 2A through 4D are omitted to simplify the illustration for easy understanding.

Figure 5:
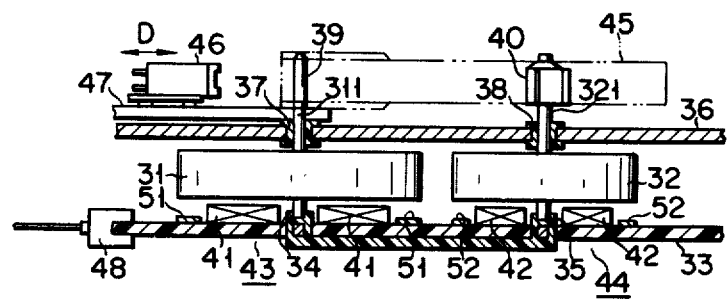
FIG. 5 is a cross-sectional view of a tape recorder according to a first embodiment of the present invention.

Referring to FIG. 5, reference numerals 31 and 32 denote rotor magnets, respectively. The lower ends of rotating shafts 311 and 321 of the rotor magnets 31 and 32 are, respectively, rotatably supported at bearings 34 and 35 mounted on a printed circuit board 33 to be described later. The intermediate portions of the rotating shafts 311 and 321 are, respectively, rotatably supported by bearings 37 and 38 mounted on a base plate 36 for placing the magnetic recording tape thereon. The upper ends of the rotating shafts 311 and 321 extend through the bearings 37 and 38 to the upper side of the base plate 36. The extending portion of the rotating shaft 311 serves as a capstan 39 which is defined as the rotating body for driving the magnetic recording tape at the normal speed. A reel 40 which serves as the rotating body for supplying or taking up the magnetic recording tape through a reel table (not shown) is fitted around the extended portion of the rotating shaft 321.

A plurality of stator cores 41 and 42 are disposed at those portions of the printed circuit board 33 which correspond to the lower surfaces (viewed in the figure) of the rotor magnets 31 and 32. The rotor magnet 31 and the stator cores 41 constitute a capstan motor 43. On the other hand, the rotor magnet 32 and the stator cores 42 constitute a reel motor 44. The other reel motor to be described later has the same structure as the reel motor 44.

The reel 40, and the other reel (not shown) are engaged with reel hubs (not shown) of a tape cassette 45 and the capstan 39 extends through a capstan insertion hole of the tape cassette 45, as indicated by the alternate long and two dashed lines in the figure. A head chassis 47 to which a recording/reproducing head 46 is mounted is disposed on the base plate 36. The head chassis 47 is supported to be slidable in the direction indicated by an arrow D. In other words, the recording-/reproducing head 46 can be contacted to or removed from the tape (not shown) of the tape cassette 45. A connector 48 is connected to one end of the printed circuit board 33. Component parts on the printed circuit board 33 are connected to other printed circuit boards (not shown), a power source (not shown) and so on through the connector 48.

Figure 6:
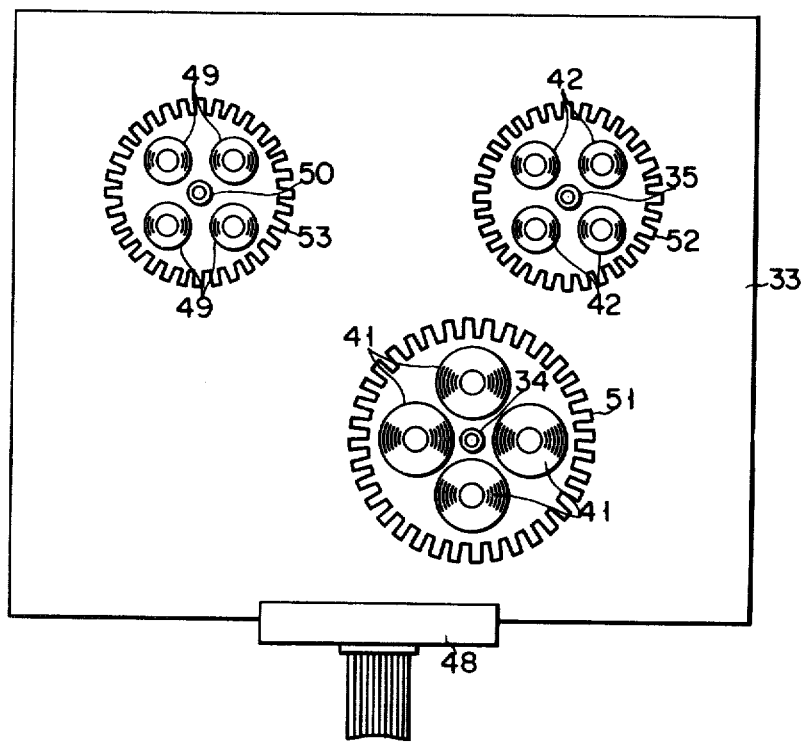

As shown in FIGS. 6 and 7A, the four stator cores 41, the four stator cores 42 and four stator cores 49 for the other reel motor are, respectively, disposed on the printed circuit board 33. A bearing 50 which pivotally supports the lower end of a rotating shaft of a rotor magnet for the other reel motor to be described later is mounted at the central part of the printed circuit board 33 which is surrounded by the stator cores 49 of the other reel motor.

FG patterns 51 to 53 are formed in an annular shape so as to surround the stator cores 41, 42 and 49 on the printed circuit board 33 and have centers which are defined as the bearings 34, 35 and 50, respectively. The FG pattern 51, 52 or 53 is formed by etching on the printed circuit board 33, as shown in FIG. 7B. A portion corresponding to the circumference of the pattern 51, 52 or 53 has rectangular wave patterns at equal intervals. The FG patterns 51 to 53 are disposed so that the rotating shafts 311, 321 and 541 of the rotor magnets 31 and 32 and the rotor magnet 54 for the other reel motor oppose the peripheries of the lower surfaces of the rotor magnets 31, 32 and 54, as shown in FIG. 7A, while being supported by the bearings 34, 35 and 50, respectively. A reel 55 on the other side is disposed in the upper portion (viewed in the figure) of the rotating shaft 541 of the rotor magnet 54 through a reel table (not shown). The rotor magnet 54 and the stator cores 49 constitute a reel motor 56. As is apparent from FIG. 7A, the stator cores 41, 42 and 49 are formed substantially in a cylindrical shape and adhered on the printed circuit board 33 by an adhesive.

Figure 7C:
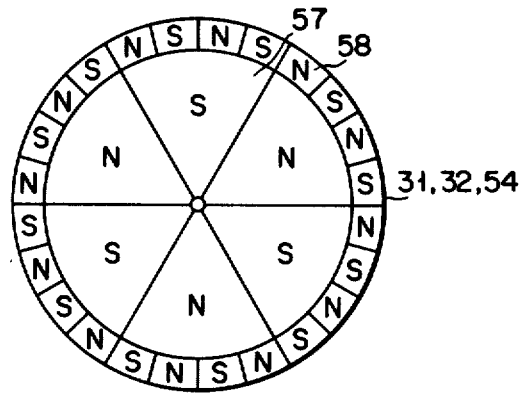
FIG. 7C is a plan view of the rotor magnet.

As shown in FIG. 7C, on those surfaces of the rotor magnets 31, 32 and 54 which are opposing the stator cores 41, 42 and 49 respectively, a magnetic pole portion 57 is formed to drive the rotor magnets 31, 32 and 54 shown in FIG. 2B. A magnetic pole portion 58 which has alternate S and N poles is formed on the peripheries of the rotor magnets 31, 32 and 54 corresponding to the FG patterns 51 to 53. The alternate arrangement of the N and S poles in the magnetic pole portion 58 is much more dense than that in the magnetic pole portion 57.

The interaction between the FG patterns 51 to 53 and the magnetic pole portion 58 will be described later. Here the operation for the tape travel will be described. In a tape recorder with the direct drive system, a plurality of touch switches (not shown) for designating a predetermined mode of operation such as the tape driving mode and the tape stoppage mode is provided. When one of the operation buttons is depressed, the corresponding touch switch is turned on. This turn-on signal is detected by an LSI (not shown) for controlling the tape recorder. The LSI supplies an output signal obtained in response to the detected signal. Thus, the capstan 39 and the reels 40 and 55 are rotated or their rotation is interrupted. The tape recorder is thus controlled by a logic circuit.

When a fast forward or rewind button is depressed, for example, the LSI supplies to the stator cores 42 or 49 of the reel motor 44 or 56 a signal for designating a predetermined rotational frequency and direction in the FF (fast forward) mode or the REW (rewind) mode. In this manner, the rotor magnet 32 or 54 is rotated in accordance with the predetermined mode of operation. The predetermined mode is thus performed. For example, when a button for designating tape travel at the normal speed (recording or reproducing button) is depressed, the LSI supplies to the stator cores 41 and 42 of the capstan motor 43 and the reel motor 44 a signal for designating the normal speed and the rotational direction in the recording or reproducing mode. The rotor magnets 31 and 32 are rotated in accordance with the predetermined mode of operation. Thus, the tape travel at the normal speed is performed. In this case, the pinch roller (not shown) is in tight contact with the capstan 39 via the magnetic recording tape.

Figure 8:
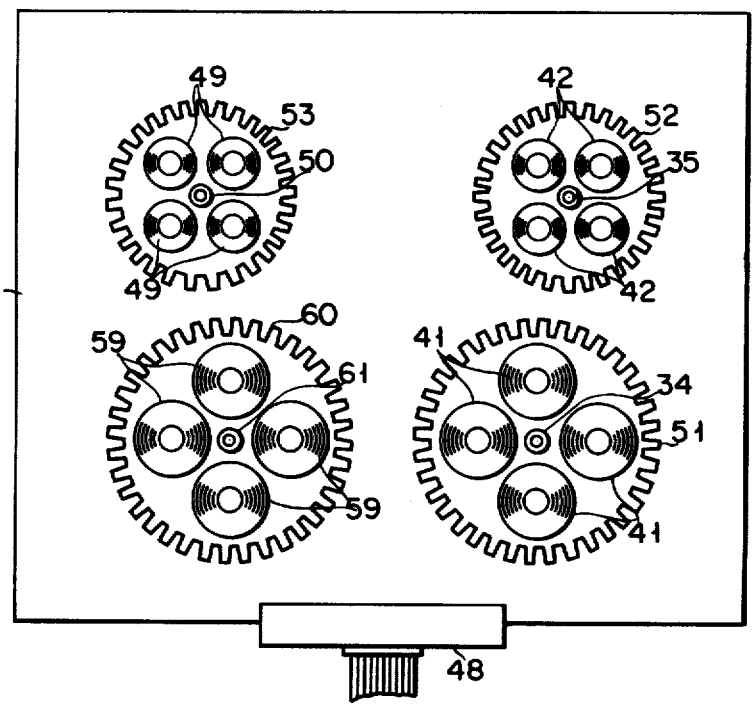
FIG. 8 is a plan view of a printed circuit board when the present invention is applied to a dual capstan system.

In the tape recorder with the dual capstan system shown in FIG. 1B, as shown in FIG. 8, stator cores 59 for the other capstan motor, an FG pattern 60, and a bearing 61 are disposed at predetermined positions on the printed circuit board 33. With this arrangement, the same rotor magnet (not shown) as the rotor magnet 31 is rotated.

With reference to FIGS. 7A to 7C, the interaction between each FG pattern 51, 52 or 53 and the corresponding magnetic pole portion 58 will be described. When the rotor magnets 31, 32 and 54 are rotated, the corresponding parts of magnetic pole portion 58 move along the FG patterns formed in a coil shape. Therefore, in response to the application of the magnetic fields of the magnetic pole portion 58, first to third voltage signals (to be referred to as first to third FG signals hereinafter) having a frequency and a phase which correspond to the rotational frequency of the rotor magnets 31, 32 and 54 are generated. The first to third FG signals are used in the capstan motor 43 and the reel motors 44 and 56 as follows.

Figure 9A:
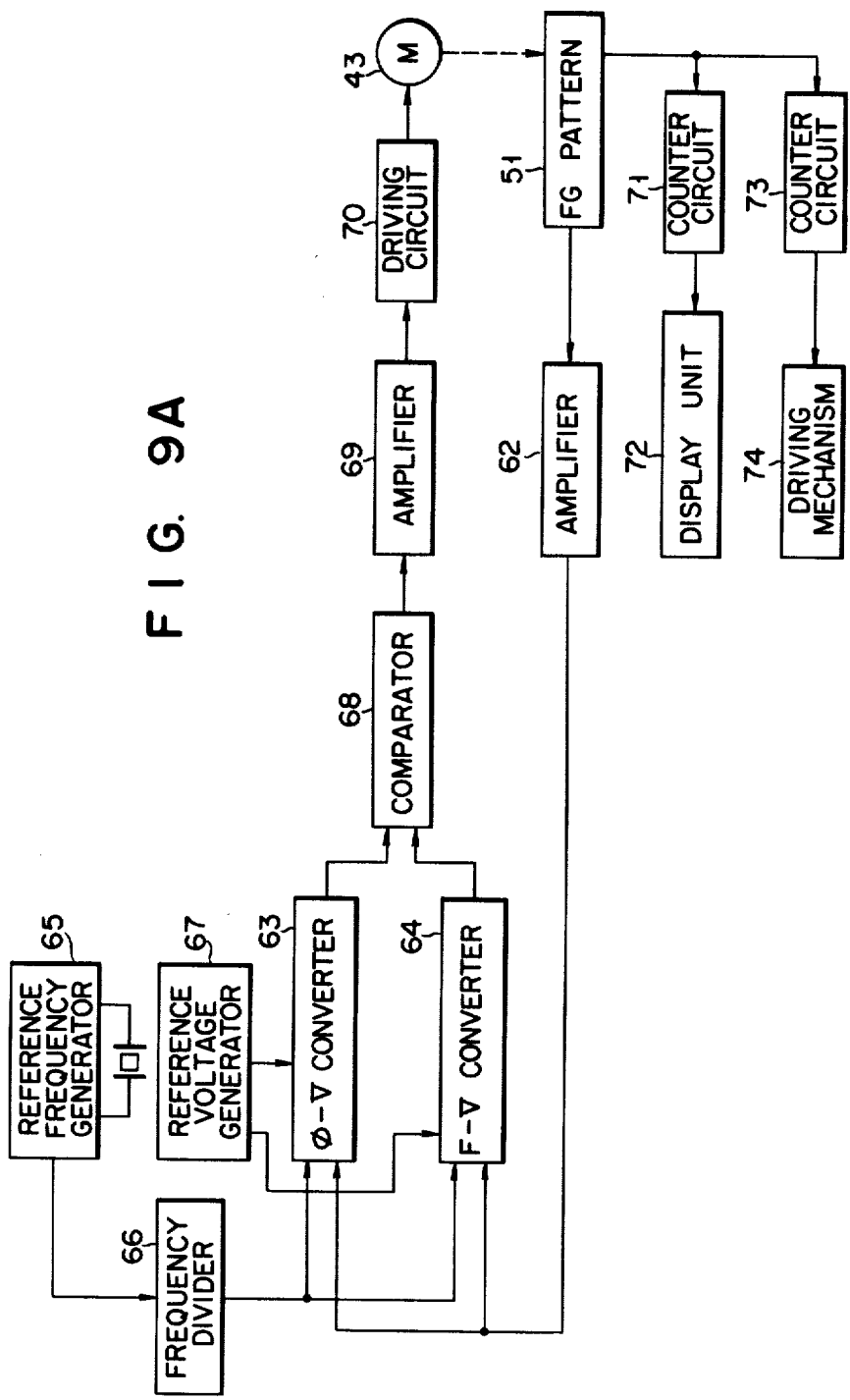
FIG. 9A is a block diagram showing a rotational frequency control system in accordance with an FG signal from a capstan motor.

A case is described wherein the first FG signal is utilized in the capstan motor 43 in the following manner. As shown in FIG. 9A, the first FG signal obtained from the FG pattern 51 which corresponds to the capstan motor 43 is supplied to one input end each of a $\phi$-V converter 63 and an F-V converter 64 through an amplifier 62. A frequency divider 66 frequency-divides an output signal from a reference frequency generator 65. The divided signal as the reference frequency signal is supplied to the other end each of the $\phi$-V converter 63 and the F-V converter 64. The $\phi$-V converter 63 and the F-V converter 64, respectively, supply to a comparator 68 voltages corresponding to the phase and frequency difference between the FG signal and the reference frequency signal, based on the reference voltage supplied from a reference voltage generator 67. The comparator 68 operates so as to set a predetermine voltage difference between the output voltage supplied from the $\phi$-V converter 63 and the F-V converter 64 and supplies a control signal for the above purpose. The control signal is supplied to the stator cores 41 of the capstan motor 43 through the amplifier 69 and a predetermined driving circuit 70.

The capstan motor 43 is controlled so that the FG signal has the same phase and frequency as the reference frequency signal to drive the magnetic recording tape at a constant speed. Since the rotational frequency is maintained constant, wow and flutter may be greatly decreased. The first FG signal from the FG pattern 51 is counted in a counter circuit 71 and the counted value is displayed in a digital display unit 72. Therefore, the tape transport amount or the tape transport time at the normal speed is displayed at the display unit 72. When the magnetic recording tape is driven at the normal speed and when the first FG signal is counted by another counter circuit 73 and the counted value reaches the predetermined value, a predetermined driving mechanism 74 may be operated, thus performing the automatic stoppage, the automatic repeat, or the automatic reverse operations.

Figure 9B:
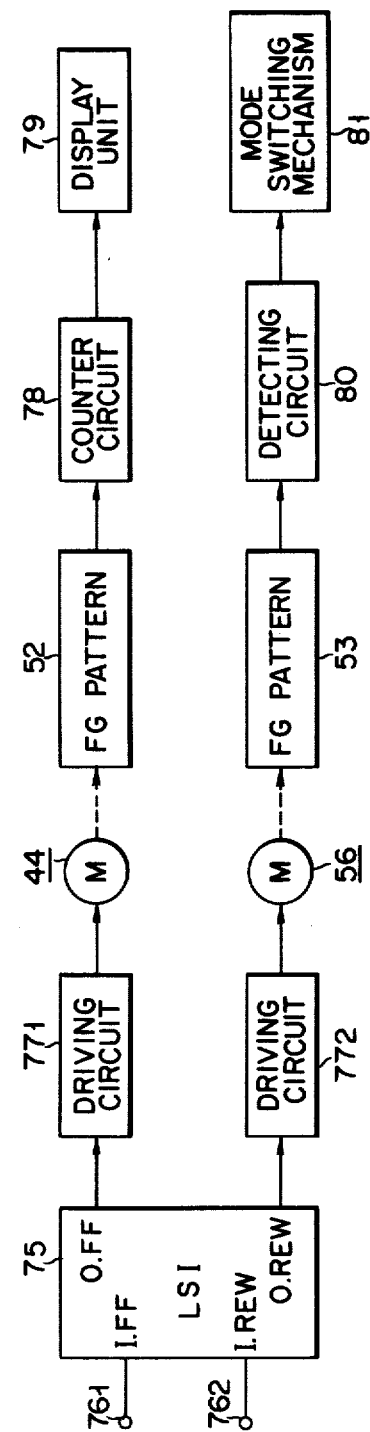
FIG. 9B is a block diagram of a tape transport amount indicator system and a mode switching system in accordance with FG signals from reel motors for driving both reel shafts.

A case is then described wherein the second and third FG signals are utilized in the reel motor 44 and 56 in the following manner. As described above, the reel motors 44 and 56 are driven in response to the output from an LSI 75 for controlling the tape recorder. FIG. 9B shows only the FF and REW modes of operation for easy understanding. When the FF or REW button (not shown) is depressed, a predetermined signal is supplied to a fast forward input end I.FF or a rewind input end I.REW of the LSI 75 through the connecting terminals 761 or 762. The LSI 75 judges whether not the mode of operation is the FF mode or the REW mode. Based on this judged result, the LSI 75 operates to supply a driving signal from a fast forward output end O.FF or a rewind output end O.REW to a driving circuit 771 or 772. When the driving circuit 771 or 772 receives the corresponding signal, the driving circuit 771 or 772 supplies a signal to the stator cores 42 or 49 for driving the reel motor 44 or 56 at the predetermined frequency and direction which correspond to the FF mode or the REW mode. The reel motor 44 or 56 is thus rotated.

When a button for designating the normal driving speed is depressed, the LSI 75 supplies a signal to drive the reel motor 44 and the capstan motor 43 from the normal speed output end (not shown) through a driving circuit (not shown).

A second FG signal obtained from the FG pattern 52 of the reel motor 44 is supplied to a counter circuit 78 wherein the frequency of the second FG signal is counted. The counted value is displayed at the digital display unit 79. Thus, the tape transport amount at normal or high speeds is displayed.

The absence or presence of a third FG signal obtained from the FG pattern 53 of the reel motor 56 is detected by a detecting circuit 80. When the magnetic recording tape is driven, the reel motor 56 is constantly rotated so that the FG signal is continuously supplied to the detecting circuit 80. At this time, the detecting circuit 80 does not supply a driving signal to a mode switching mechanism 81 to be described later. When the magnetic recording tape reaches the end and the reel motor 56 stops rotating, the detecting circuit 80 detects that the third FG signal is not received thereto over a certain period of time. Thus, the detecting circuit 80 supplies a driving signal to the mode switching mechanism 81 to switch the current mode to a predetermined different mode.

The mode switching mechanism 81 may include various mode switching mechanisms such as the automatic stop mechanism ASO which switches the reproducing mode to the stop mode, the automatic repeat mechanism which switches the reproducing mode to the REW mode, the automatic reverse mechanism which switches the recording/reproducing mode of one track to the recording/reproducing mode of the other track of the tape and so on. When the driving signal from the detecting circuit 80 is received by the mode switching mechanism 81, the mode switching operation is performed. For example, when the magnetic recording tape reaches the end and the rotation of the reel motor 56 is interrupted, the mode switching operation from the reproducing mode to the automatic stop mode, the automatic repeat mode or the automatic reverse mode is performed.

The FG signal supplied to the detecting circuit 80 may be supplied from the FG pattern 52 of the reel motor 44, and then the FG pattern 53 for the reel motor 56 may be omitted. Alternatively, the FG signal supplied to the counter circuit 78 may be obtained from the FG pattern 53 of the reel motor 56, and then the FG pattern 52 of the reel motor 56 may be omitted. Thus, the arrangement of the FG pattern may be modified for the convenience of the design configuration.

With the above structure, the capstan motor 43 and the reel motors 44 and 56 for driving the capstan 39 and the pair of reels 40 and 55 which are necessary for driving the magnetic recording tape are integrally disposed on the printed circuit board 33. Therefore, separate support members for supporting the motors 43, 44 and 56 need not be formed, thus achieving simple construction and compactness. The stator cores 41, 42 and 49 are directly mounted on the printed circuit board 33, so that the wiring operation is very much simplified.

Further, the capstan motor 43 is rotated at a constant speed by comparing the FG signal and the reference frequency signal, so that wow and flutter are greatly decreased. The rotational frequency and direction of the reel motors 44 and 56 are determined by controlling only the amount and direction of a current flowing in the stator cores 42 and 49 in accordance with the mode of operation such as the FF mode, the REW mode, the reproducing mode and the recording mode. Thus, the mode switching operation is very simplified. Further, since the substantially movable part is only the rotor magnets 32 and 54, the structure is very simplified and the compact tape recorder is manufactured.

The rotor magnets 31, 32 and 54 may not entirely comprise magnets. Magnets each having the magnetic pole portions 57 and 58 may be stacked in one surface of a disc-shaped rotating body.

The automatic stop operation, the automatic repeat operation and the automatic reverse operation are switched from the normal speed tape transport mode by utilizing the FG signal obtained from the capstan motor 43 or the reel motors 44 and 56. Therefore, the mode switching operation is guaranteed with simple construction.

The frequency of the FG signal obtained from the capstan motor 43 or the reel motors 44 and 56 is counted to display the tape transport amount. Therefore, a separate tape counter mechanism is not required. Thus, the structure of the tape recorder is further simplified and the compactness of the tape recorder is further accomplished.

The present invention is not limited to the above mentioned first embodiment. Various changes and modifications may be made within the sprit and scope of the present invention. Various embodiments of the tape recorder according to the present invention will be described with reference to FIGS. 10 to 30. The same reference numerals as in the first embodiment denote the same parts in the following embodiments and their modifications and the detailed description thereof will be omitted.

Figure 10:
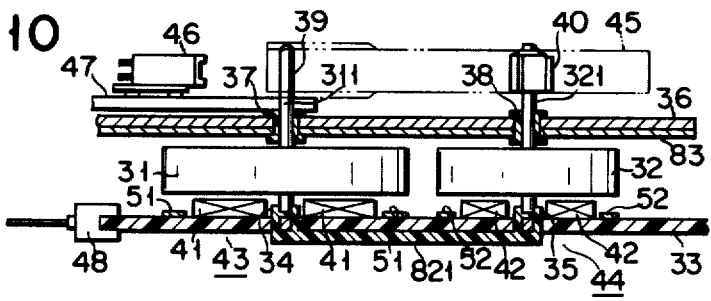
FIG. 10 is a cross-sectional view of a tape recorder according to a second embodiment of the present invention.

A tape recorder according to a second embodiment of the present invention is shown in FIG. 10. In this embodiment, magnetic shield means is added to the arrangement of the first embodiment. As shown in FIG. 10, a magnetic shield member 83 as the magnetic shield means is adhered on the lower surface of the base plate 36 opposing the rotor magnets 31 and 32. As a result, the magnetic fields generated by the rotor magnets 31 and 32 and the stator cores 41 and 42 may not adversely affect the magnetic recording tape of the tape cassette 45 and the recording/reproducing head 46.

In the magnetic shield means shown in FIG. 10, the magnetic shield member 83 may be formed on the upper surface (viewed in the figure) of the base plate 36. Further, when the magnetic shield member 83 is to be formed on the base plate 36, the base plate 36 is preferably made of a synthetic resin material for better magnetic shielding.

For magnetically shielding the capstan motor 43 and the reel motor 44 from the magnetic recording tape 13 and the recording/reproducing head 46, magnetic shield means comprises a magnetic shield member 84 of substantially a box shape which has through holes 841 and 842 through which the rotating shafts 311 and 321 of the rotor magnets 31 and 32 extend, as shown in FIG. 11 as one modification of the second embodiment. The magnetic shield member 84 may cover the rotor magnets 31 and 32, and the stator cores 41 and 42.

FIGS. 12 and 13 show the tape recorder according to a third embodiment of the present invention. Magnetic shield means comprises magnetic shield members 85 of a partition shape which are disposed on the printed circuit board 33 and between the capstan motor 43 and the reel motor 44, between the reel motor 44 and the other reel motor 56 (FIG. 7A), and between the capstan motor 43 and the other reel motor 56 (FIG. 7A). The magnetic shield members 85 shield the portions of the capstan motor 43 and the reel motors 44 and 56 in a T shape as shown in FIG. 13 when the printed circuit board 33 is viewed from the top.

When the capstan motor 43 and the reel motors 44 and 56 are shielded by the magnetic shield members 85, the magnetic fields generated by the corresponding rotor magnets 31, 32 and 54 and the stator cores 41, 42 and 49 are not applied to their motors 43, 44 and 56. If the magnetic fields generated by the rotor magnets 32 and 54 and the stator cores 42 and 49 of the reel motors 44 and 56 are applied to the capstan motor 43, the rotational frequency of the capstan motor 43 can not be held constant, thus increasing wow and flutter.

Figure 14:
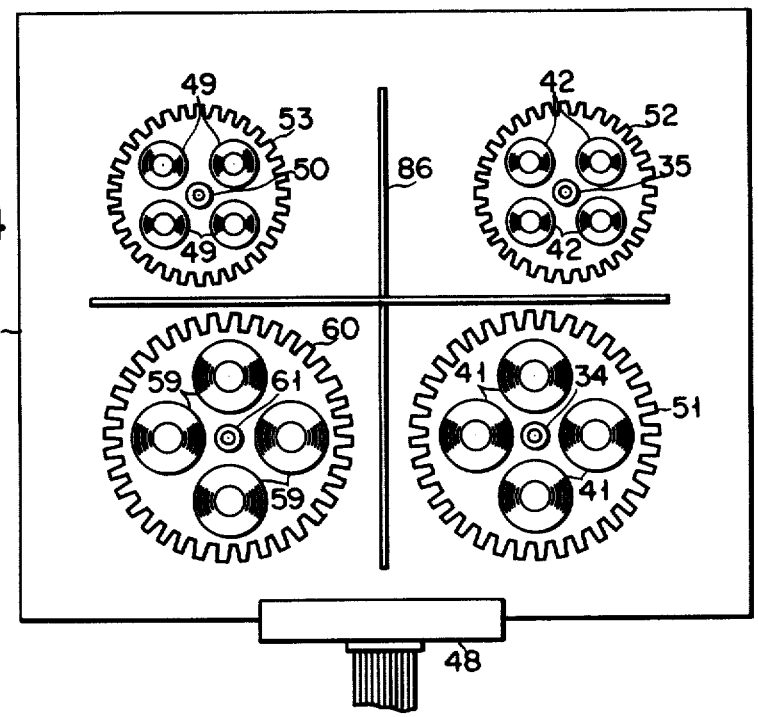
FIG. 14 is a plan view of a modification of the third embodiment shown in FIG. 13.

In a tape recorder with a dual capstan system, as shown in FIG. 14 as one modification of the third embodiment, a magnetic shield member 86 is formed substantially in a cross shape on the printed circuit board 33. Thus, magnetic shielding among the motors is accomplished.

Figure 15:
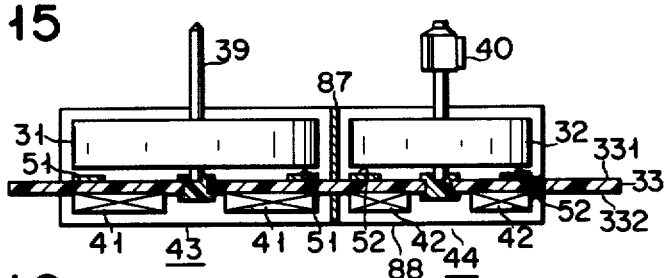
FIG. 15 is a cross-sectional view of a tape recorder according to a fourth embodiment of the present invention.

As shown in FIG. 15 as a fourth embodiment, the stator cores 41 and 42 of the capstan motor 43 and the reel motor 44 may be disposed on a second surface 332 opposing a first surface 331 which faces the rotor magnets 31 and 32 of the printed circuit board 33. When the stator cores 41 and 42 are formed on the second surface of the printed circuit board 33, a magnetic shield member 87 must be disposed on the first surface 331 of the printed circuit board 33 between the rotor magnets 31 and 32 so as to shield them from each other. Further, a magnetic shield member 88 must be disposed on the second surface 332 of the printed circuit board 33 between the stator cores 41 and 42 so as to shield them from each other.

Figure 16:
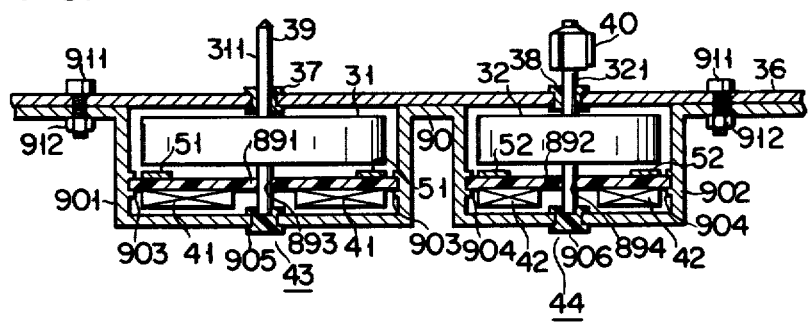
FIGS. 16 and 17 are cross-sectional views of tape recorders according to fifth and sixth embodiments, respectively, of the present invention.
Figure 17:
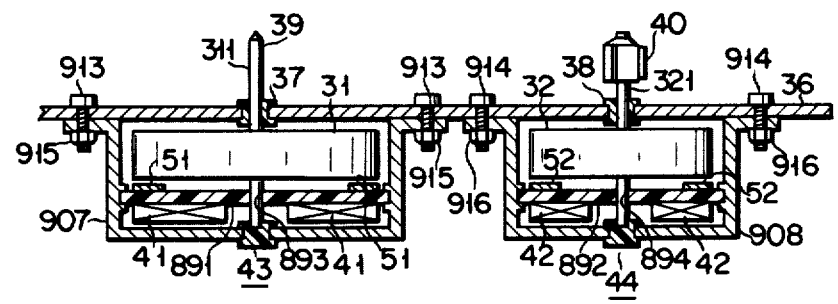

Further, as shown in FIGS. 16 and 17 as fifth and sixth embodiments, respectively, magnetic shield means may be formed between the capstan motor 43 and the reel motor 44. In particular, referring to FIG. 16, the lower portions (viewed in the figure) of the rotating shafts 311 and 321 of the rotor magnets 31 and 32 are formed extending through the through holes 893 and 894 respectively formed on printed circuit boards 891 and 892 which respectively oppose the rotor magnets 31 and 32. On upper surfaces of the printed circuit boards 891 and 892 opposing the rotor magnets 31 and 32 are FG patterns 51 and 52. The stator cores 41 and 42 are disposed on the lower surfaces.

The capstan motor 43 comprises the rotor magnet 31 and the printed circuit board 891. The reel motor 44 comprises the rotor magnet 32 and the printed circuit board 892. The reel motors 43 and 44 are housed in recesses 901 and 902 of a magnetic shield member 90, respectively. Both ends of the magnetic shield member 90 are mounted on the base plate 36 with screws 911 and nuts 912. Supports 903 and 904 for supporting the printed circuit boards 891 and 892 are respectively formed in the recesses 901 and 902 of the magnetic shield member 90. Bearings 905 and 906 are mounted on the bottom surfaces of the recesses 901 and 902 to support the lower ends (viewed in the figure) of the rotating shafts 311 and 321 of the rotor magnets 31 and 32. The magnetic shield member 90 shields the capstan motor 43 from the reel motor 44 and supports the rotor magnets 31 and 32.

Further, as shown in FIG. 17 as the sixth embodiment, the recesses 901 and 902 of the magnetic shield member 90 shown in FIG. 16 are separated. The capstan motor 43 and the reel motor 44 are covered with independent shield members 907 and 908. The magnetic shield member 907 or 908 is mounted on the base plate 36 with screws 913 or 914 and nuts 915 or 916.

Figure 18:
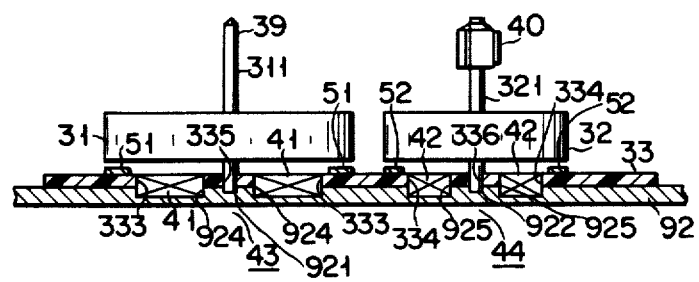
FIGS. 18 and 19 are a cross-sectional view and a partially cutaway perspective view, respectively, of a tape recorder according to a seventh embodiment of the present invention.
Figure 19:
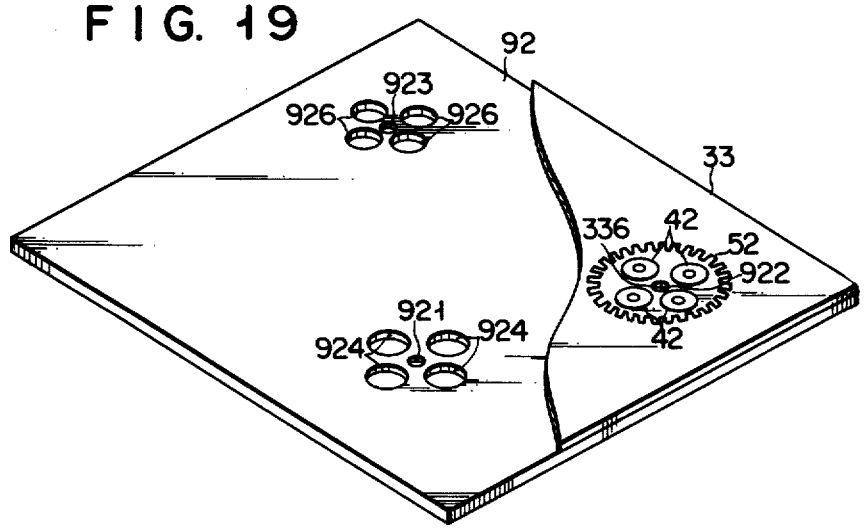

In the seventh embodiment, as shown in FIGS. 18 and 19, a base plate 92 made of a synthetic resin material may be adhered to the lower surface (viewed in the figure) of the printed circuit board 33. Recesses 921, 922 and 923 as bearings are formed in those parts of the base plate 92 which align with the rotating shafts 311, 321 and 541 of the rotor magnets 31, 32 and 54. Further, in the base plate 92, recesses 924, 925 and 926 are formed which align with the stator cores 41, 42 and 49.

While the printed circuit board 33 and the base plate 92 are tightly adhered, to one another, the rotating shafts 311, 321 and 541 of the rotor magnets 31, 32 and 54 are respectively supported by the recesses 921 to 923 as bearings of the base plate 92 through the through holes 335 and 336 of the printed circuit board 33. The stator cores 41, 42 and 49 fit in the recesses 924, 925 and 926, respectively.

With this arrangement, the bearings need not be mounted on the printed circuit board 33 since the recesses 921 to 923 are formed in the base plate as bearings. In other words, the weight of the rotor magnets 31, 32 and 54 is not supported by the printed circuit board 33 and is supported by the base plate 96. Therefore, the thickness of the printed circuit board 33 is made thin. Further, since the base plate 92 is in tight contact with the printed circuit board 33, the printed circuit board 33 is reinforced.

Figure 20:
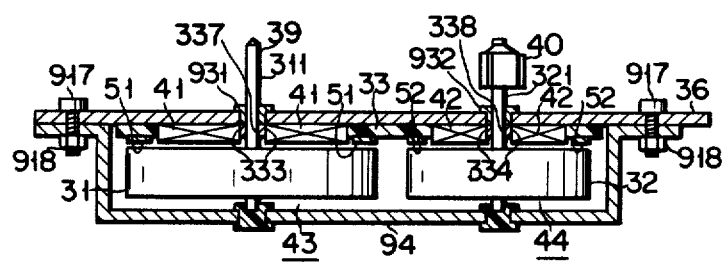
FIGS. 20 and 21 are cross-sectional views of tape recorders according to eighth and ninth embodiments, respectively, of the present invention.

In an eighth embodiment as shown in FIG. 20, the printed circuit board 33 may be mounted on the lower surface of the base plate 36. In the same manner as described with reference to FIG. 18, the stator cores 41 and 42 are fitted in the through holes 333 and 334 which are formed in the printed circuit board 33. The printed circuit board 33 is adhered on the lower surface (viewed in the figure) of the base plate 36 by an adhesive. The upper portions of the rotating shafts 311 and 321 of the rotor magnets 31 and 32 extend through the through holes 337 and 338 formed in the printed circuit board 36 and the bearings 931 and 932 which are respectively mounted on the base plate 36. Thus, the rotating shafts 311 and 321 extend above the base plate 36. The lower ends of the rotating shafts 311 and 321 of the rotor magnets 31 and 32 are rotatably supported by a support member 94 which is mounted to the base plate 36 with screws 917 and nuts 918.

With the above structure, the printed circuit board 33 and the support member 94 which supports the rotor magnets 31 and 32 is mounted to the base plate 36. Therefore, members which support the printed circuit board 33, the support member 94 and the like, need not be mounted within a cabinet (not shown) of the tape recorder. Thus, such a tape recorder is simple in construction and compact in size. The assembly of the capstan motor 43 and the reel motor 44 is performed when the operating components (not shown) of the tape recorder are mounted on the base plate 36. Thus, the assembly operation is simplified.

Figure 21:
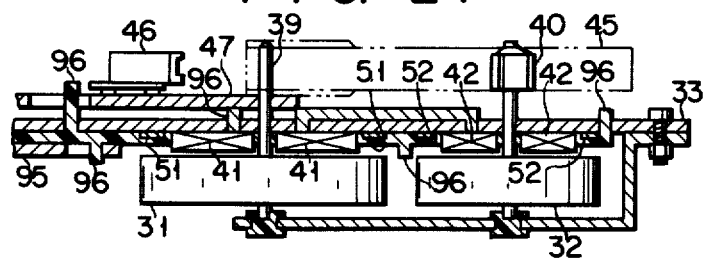

In a ninth embodiment as shown in FIG. 21, the printed circuit board 33 may be directly used as the member for placing the magnetic recording tape thereon in place of the base plate 36. In this case, various pins 96 for fixing the tape cassette 45 and for guiding various movable members 95 and the head chassis 47 may be mounted on the printed circuit board 33 later on.

In this manner, when the printed circuit board 33 is used in place of the base plate 36, a display unit and a control section are formed to arrange various operating buttons for a power switch 106, tape selection buttons 107 for the normal, chrome and metal tapes, a display section 108 for the tape selection buttons, a noise reduction (NR) button 109 and its display section 110, and tape transport condition indicator 111. The tape transport condition indicator 111 is formed by painting arbitrary colors at a portion between the reels 40 and 55 of the printed circuit board 33 by silk screen printing. When the magnetic recording tape is driven to the reel 40 or 55, the tape transport condition indicator 111 is gradually covered by the wound tape, so that the tape transport amount is indicated.

Inside the cassette tape deck or the like is assembled the printed circuit board 33 on which, in addition to the capstan motor 43 and the reel motors 44 and 56, various operating and display sections are formed. The printed circuit board 33 is located substantially parallel to a front panel 1111 of the cassette tape deck. A cassette cover 1112 is made of a transparent material through which the reels 40 and 55 and the indicator 111 can be seen. Through holes, display windows and the like are formed on the front panel 1111 so as to permit control of the power switch 106 and the mode selection buttons 107 and 109 and to allow checking of the display at the display sections 108 and 110.

On the front panel 1111 are formed a control section 1113 for designating a predetermined mode of tape transport operation and the stop mode, a VU/peak level meter 1114, a recording level adjusting dial 1115, a reproducing output level adjusting dial 1116, a headphone jack 1117, a microphone jack 1118 and so on.

Figure 22:
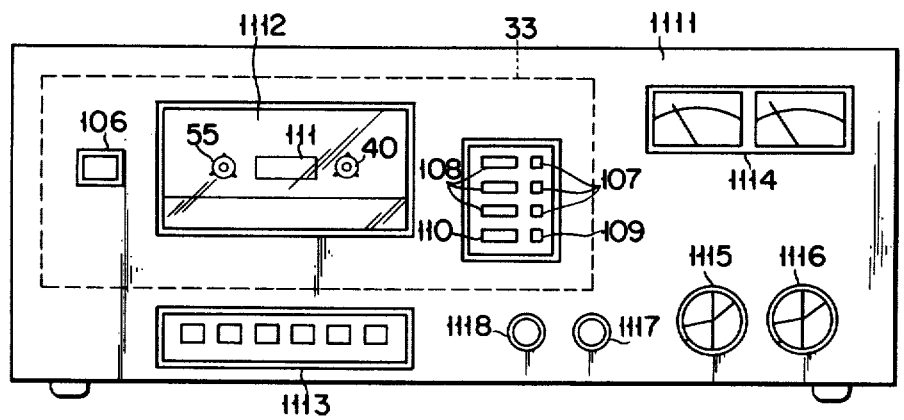
FIG. 22 is a front view of the tape recorder shown in FIG. 21.

As described above, the capstan motor 43 and the reel motors 44 and 56 are disposed on the printed circuit board 33. At the same time, the control section for various modes of operation and the display sections are also formed on the printed circuit board 33. Thus, the tape recorder is simple in construction and compact in size. Further, the soldering operation of the printed circuit board 33 is performed at one time. The manufacturing process of the tape recorder is made simple. As shown in FIG. 22, while the control section for various modes of operation and the display section are formed on the front panel 1111, the printed circuit board 33 is assembled in side the cassette tape deck or the like. The efficiency in the manufacture of the tape recorder is further improved.

When the control section 1113, the VU/peak level meter 1114, the recording level adjusting dial 1115, the playback output level adjusting dial 1116, the headphone jack 1117, the microphone jack 1118 and the like are adopted to be mounted on the printed circuit board 33, the assembly operation is further simplified. The solder resist or the silk print may be deposited on that portion of the printed circuit board 33 which can be seen through the front panel 1111, thus maintaining the good appearance of the tape recorder. The tape transport condition indicator 111 may comprise, an LED, a liquid crystal display unit or the like.

Figure 23:
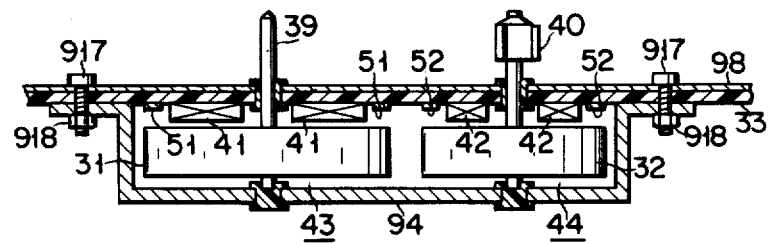
FIG. 23 is a cross-sectional view of a first modification of the tape recorder of the ninth embodiment shown in FIG. 21.

When the printed circuit board 33 is to be used as the member for placing the magnetic recording tape directly thereon in place of the base plate 36, as shown in a first modification of the ninth embodiment of FIG. 23, a magnetic shield member 98 may be adhered on the upper surface (viewed in the figure) of the printed circuit board 33. With this arrangement, the capstan motor 43 and the reel motor 44 are shielded from the magnetic recording tape 13 and the recording/reproducing head 46.

Figure 24:
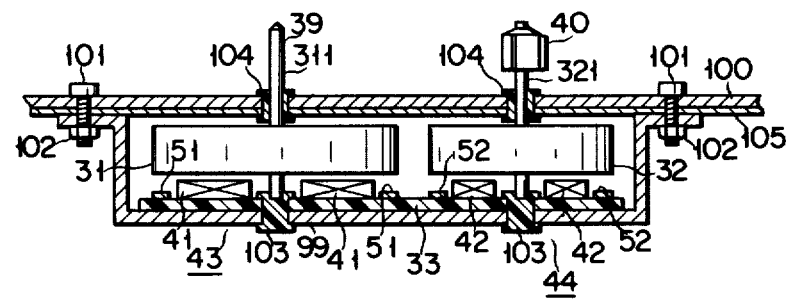
FIG. 24 is a cross-sectional view of a second modification of the tape recorder of the ninth embodiment shown in FIG. 21.

In a second modification of the ninth embodiment as shown in FIG. 24, two printed circuit boards are used. In the part under the rotor magnets 31 and 32, the printed circuit board 33 is disposed wherein the stator cores 41 and 42 and the FG patterns 51 and 52 are formed. The printed circuit board 33 is located at the bottom surface of the support member 99 formed in a substantially recessed shape. The support member 99 is mounted to the other printed circuit board 100 with screws 101 and nuts 102 in place of the base plate 36. The lower ends (viewed in the figure) of the rotating shafts 311 and 321 of the rotor magnets 31 and 32 are, respectively, rotatably supported by bearings 103 mounted at the bottom of the printed circuit board 33 and the support member 99. The upper portions (viewed in the figure) of the rotating shafts 311 and 321 of the rotor magnets 31 and 32 extend through bearings 104 mounted to the printed circuit board 100 and further extend upward from the printed circuit board 100.

In this manner, with the arrangement which has the two printed circuit boards 33 and 100, a magnetic shield member 105 is attached to the lower surface (viewed in the figure) of the printed circuit board 100. Thus, the capstan motor 43 and the reel motor 44 are magnetically shielded from the magnetic recording tape and the recording/reproducing head 46.

Figure 25:
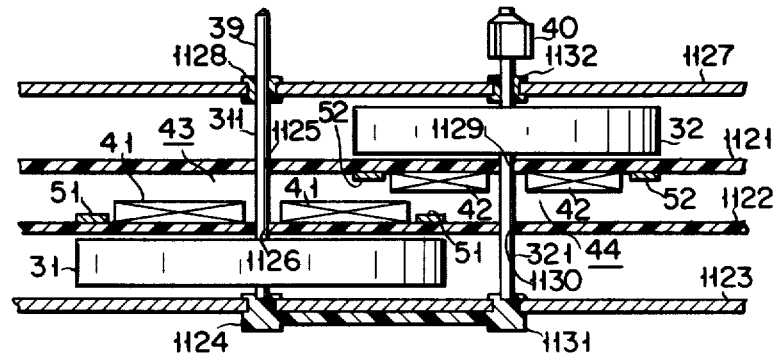
FIGS. 25 and 26,are a cross-sectional view and a schematic plan view, respectively, of a tape recorder according to a tenth embodiment of the present invention.
Figure 26:
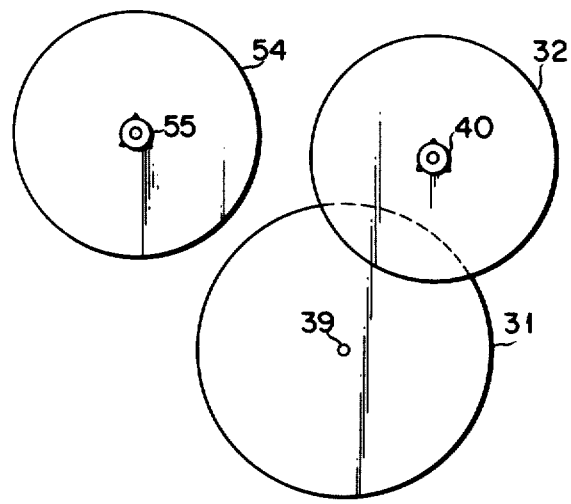

In a tenth embodiment as shown in FIGS. 25 and 26, parts of the rotor magnets 31 and 32 of the capstan motor 43 and the reel motor 44 may be overlapped to each other. When the rotor magnets 31 and 32 of FIG. 25 are viewed from the top as shown in FIG. 26, parts of the rotor magnets 31 and 32 overlap to form a step. Printed circuit boards 1121 and 1122 are disposed parallel to each other between the rotor magnets 31 and 32. The stator cores 42 and the FG pattern 52 are formed on that portion of the printed circuit board 1121 which opposes the rotor magnet 32. The stator cores 41 and the FG pattern 51 are formed on that portion of the printed circuit board 1122 which opposes the rotor magnet 31.

The lower end (viewed in the figure) of the rotating shaft 311 of the rotor magnet 31 is rotatably supported by a bearing 1124 mounted to a base plate 1123 which is substantially parallel to the printed circuit boards 1121 and 1122. The upper portion (viewed in the figure) of the rotating shaft 311 of the rotor magnet 31 extends through through holes 1126 and 1125 formed in the printed circuit boards 1122 and 1121 and a bearing 1128 mounted to a base plate 1127 which is parallel to the printed circuit boards 1122 and 1121. The upper portion of the rotating shaft 311 of the rotor magnet 31 further extends upward from the base plate 1127 in the figure.

Further, the lower portion (viewed in the figure) of the rotating shaft 321 of the rotor magnet 32 extends through the through holes 1129 and 1130 of the printed circuit boards 1121 and 1121 and is rotatably supported by a bearing 1131 mounted to the base plate 1123. The upper portion (viewed in the figure) of the rotating shaft 321 of the rotor magnet 32 extends through a bearing 1132 mounted to the base plate 1127 and further extends upward from the base plate 1127. The rotor magnet 54 is disposed on the same plane as the rotor magnet 32 is disposed and in the same manner as the rotor magnet 32.

Therefore, when parts of the rotor magnets 31 and 32 overlap as described above, the diameter of the rotor magnets 31 and 32 can be made larger without changing the distance between the capstan 39 and the reel 40. Thus, the inertia a mount of the rotor magnets 31 and 32 is increased and the rotational torque is substantially improved. The above arrangement is very effective when the distance between the capstan 39 and the reel 40 is fixed.

Figure 27:
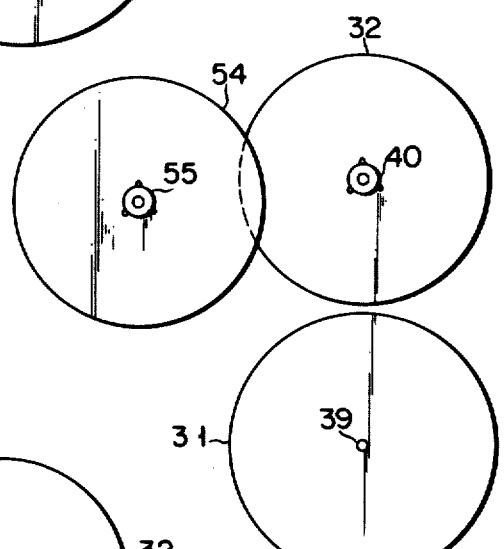
FIG. 27 is a plan view schematically showing a first modification of the tenth embodiment shown in FIGS. 25 and 26.

In a first modification of the tenth embodiment as shown in FIG. 27, parts of the rotor magnets 32 and 54 of the reel motors 44 and 56 may overlap, when viewed from the top, forming a space therebetween. In other words, the rotor magnets 32 and 54 are formed on different levels. The rotor magnets 31 and 54 are disposed on the same plane. Thus, the rotational torque may be increased without changing the distance between the reel 40 and the reel 55. This arrangement is especially suitable when applied to a cassette tape recorder.

Figure 28:
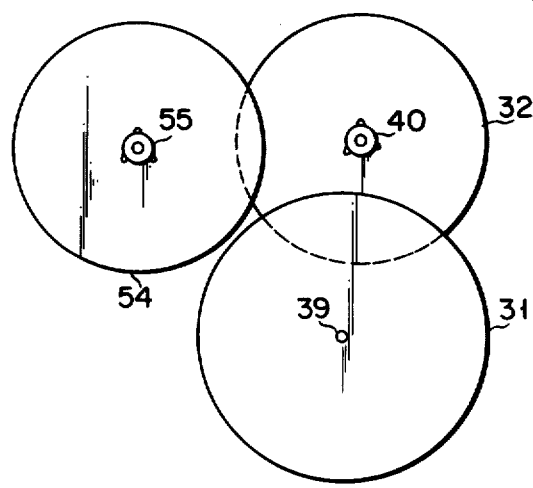
FIG. 28 is a plan view schematically showing a second modification of the tape recorder of the tenth embodiment.

In a second modification of the tenth embodiment as shown in FIG. 28, parts of the rotor magnet 32 of the reel motor 44 and the rotor magnet 31 of the capstan motor 43, and parts of the rotor magnet 32 of the reel motor 44 and the rotor magnet 54 of the reel motor 56 may overlap when viewed from the top. The rotor magnet 54 and the rotor magnet 31 are disposed on the same plane. With this arrangement, the effects of the first and second modifications of the tenth embodiment are simultaneously obtained.

Figure 29:
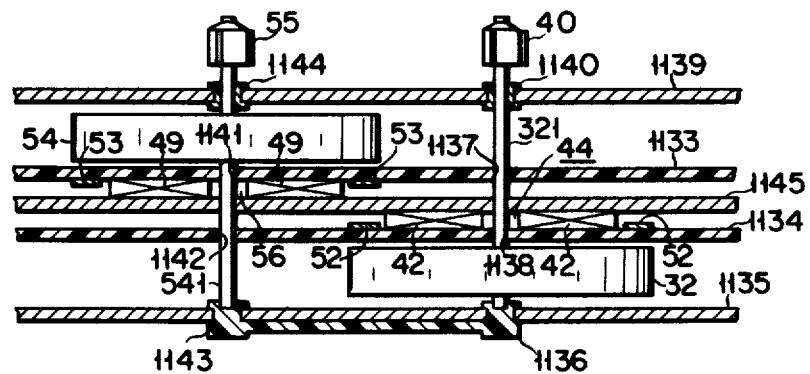
FIG. 29 is a cross-sectional view of a third modification of the tenth embodiment.

In a third modification of the tenth embodiment as shown in FIG. 29, a magnetic shield member 1145 may be inserted between printed circuit boards 1133 and 1134, so that the reel motor 44 is magnetically shielded from the reel motor 56. Further, a magnetic shield member (not shown) may be inserted between the printed circuit boards 1121 and 1122 of FIG. 25 to magnetically shield the capstan motor 43 from the reel motor 44.

Figure 30:
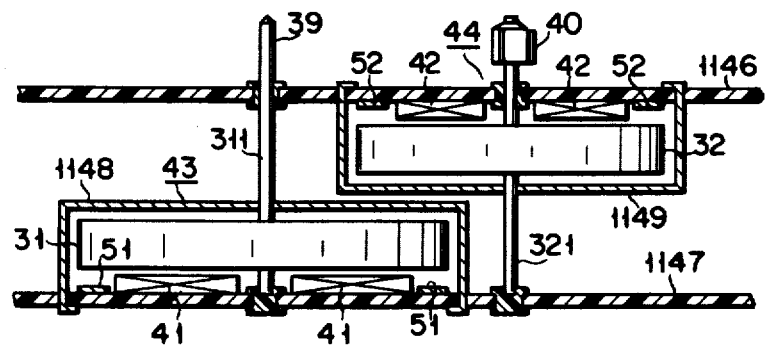
FIG. 30 is a cross-sectional view of a fourth modification of the tenth embodiment.

In a fourth modification of the tenth embodiment as shown in FIG. 30, the arrangement is the same as in FIG. 26 except that the printed circuit boards 1121 and 1122 are omitted and printed circuit boards 1146 and 1147 are disposed in place of the base plate 1127 and 1123. The stator cores 42 and 41 and the FG patterns 52 and 51 are formed on the printed circuit boards 1146 and 1147, respectively. Box-shaped magnetic shield members 1148 and 1149 cover the rotor magnet 31 and the stator cores 41, and the rotor magnet 32 and the stator cores 42, respectively. Thus, the capstan motor 43 and the reel motor 44 are magnetically shielded. This design may also be applied to the magnetic shield between the reel motors 44 and 56.

What we claim is:

1. In a tape recorder which comprises
   a first rotating body for driving a magnetic recording tape at a normal constant speed;
   first driving means for driving said first rotating body about a rotational central axis, said first driving means including a first motor having a first rotor magnet which is rotatably disposed, a first rotating shaft mounted at a rotational center of said first rotor magnet and having a rotational central axis which coincides with the rotational central axis of said first rotating body, and a first stator coil for applying a rotating magnetic field to said first rotor magnet;
   a second rotating body for taking up the magnetic recording tape;
   second driving means for driving said second rotating body about a rotational central axis;
   a third rotating body for supplying the magnetic recording tape; and
   third driving means for driving said third rotating body about a rotational central axis,
   the improvement in which
   said first driving means includes
   first output means for producing a signal which has a frequency in accordance with a rotational frequency of said first rotor magnet, second output means for producing a signal which has a reference frequency and control means for comparing outputs from said first and second output means and for controlling to drive said first motor at a predetermined rotational frequency;
   said second driving means includes a second motor having a second rotor magnet which is rotatably disposed, a second rotating shaft mounted at a rotational center of said second rotor magnet and having a rotational central axis which coincides with the rotational central axis of said second rotating body, and a second stator coil for applying a rotating magnetic field to said second rotor magnet; and
   said third driving means includes a third motor having a third rotor magnet which is rotatably mounted, a third rotating shaft mounted at a rotational center of said third rotor magnet and having a rotational central axis which coincides with the rotational central axis of said third rotating body, and a third stator coil for applying a rotating magnetic field to said third rotor magnet.

2. A tape recorder according to claim 1, which further includes mounting means for mounting said first motor, said second motor and said third motor.

3. A tape recorder according to claim 2, wherein said mounting means has a single common printed circuit board on which said first, second and third stator coils are mounted.

4. A tape recorder according to claim 2, wherein said mounting means has first and second printed circuit boards, said first stator coil is mounted on said first printed circuit board and said second stator coil is mounted on said second printed circuit board.

5. A tape recorder according to claim 3, wherein said first output means has an annular coil mounted on said printed circuit board and opposing said first rotor magnet.

6. A tape recorder according to claim 4, wherein said first output means has an annular coil mounted on said first printed circuit board and opposing said first rotor magnet.

7. A tape recorder according to claim 5 or 6, wherein said annular coil is formed in a circular form, a center of which is aligned with the rotational center of said first rotor magnet.

8. A tape recorder according to claim 1, which further includes magnetic shield means for preventing leakage of generated magnetic fields.

9. A tape recorder according to claim 3, which further includes magnetic shield means for preventing leakage of generated magnetic fields.

10. A tape recorder according to claim 9, wherein said magnetic shield means includes a magnetic shield plate which is mounted on the printed circuit board and between adjacent motors and which prevents leakage of a magnetic field generated from one of said motors to said other motor.

11. A tape recorder according to claim 9, wherein said magnetic shield means includes a magnetic shield plate which is mounted on a printed circuit board and between said three motors and the magnetic recording tape and which prevents leakage of magnetic fields generated by said three motors to the magnetic recording tape.

12. A tape recorder according to claim 9, which further includes a chassis which is disposed between said three motors and the magnetic recording tape and which rotatably supports first to third rotating shafts wherein said magnetic shield means includes a magnetic shield plate mounted on said chassis to prevent leakage of magnetic fields generated by said three motors to the magnetic recording tape.

13. A tape recorder according to claim 4, further includes magnetic shield means for preventing leakage of generated magnetic fields.

14. A tape recorder according to claim 13, wherein said magnetic shield means includes a magnetic shield plate mounted on each printed circuit board to prevent leakage of a magnetic field generated by one of said three motors to said other motors.

15. A tape recorder according to claim 13, wherein said magnetic shield means includes a first magnetic shield plate mounted on the first printed circuit board and between the first motor and the magnetic recording tape and which prevents leakage of a magnetic field generated by said first motor to the magnetic recording tape, and a second magnetic shield plate which is mounted on the second printed circuit board and between the second motor and the magnetic recording tape and which prevents leakage of a magnetic field generated by said second motor to the magnetic recording tape.

16. A tape recorder according to claim 13, which further comprises a chassis which is disposed between said three motors and the magnetic recording tape and which rotatably supports three rotating shafts, wherein said magnetic shield means includes a magnetic shield plate mounted to said chassis to shield magnetic fields generated by said three motors from the magnetic recording tape.

17. A tape recorder according to claim 1, wherein said three rotor magnets are disposed on the same plane.

18. A tape recorder according to claim 2, wherein said mounting means includes first and second printed circuit boards which are disposed along a first rotating shaft at predetermined intervals.

19. A tape recorder according to claim 18, wherein said first stator coil is mounted on the first printed circuit board, said second stator coil is mounted on the second printed circuit board, and said first rotor magnet has a radius such that part of said first rotor magnet overlaps with part of said second rotor magnet.

20. A tape recorder according to claim 18, wherein said second stator coil is mounted on the first printed circuit board, said third stator coil is mounted on the second printed circuit board, and said second and third rotor magnets have radii respectively such that part of said second rotor magnet overlaps with part of said third rotor means.

21. A tape recorder according to claim 18, wherein said first and third stator coils are mounted on the first printed circuit board, said second stator coil is mounted on the second printed circuit board, said first rotor magnet has a radius such that part of said first rotor magnet overlaps with part of said second rotor magnets, and said second and third rotor magnets have radii such that part of said second rotor magnet overlaps with part of said third rotor magnet.

22. A tape recorder according to any one of claims 18 to 21, which further comprises magnetic shield means for preventing leakage of generated magnetic fields.

23. A tape recorder according to claim 22, wherein said magnetic shield means includes a magnetic shield plate which is disposed between said first and second printed circuit boards.

24. A tape recorder according to claim 22, wherein said magnetic shield means includes three magnetic shield plates which are disposed to respectively surround said motors.

25. A tape recorder according to claim 1, which further comprises control means for causing the second and/or third driving means to rotate the second and/or third rotor magnet in a tape fast run mode at a speed higher than in a tape constant run mode.

26. A tape recorder according to claim 25, wherein said control means causes the second and third driving means to rotate the second and third rotor magnet at the higher speed in a Fast Forward mode and a Rewind mode of the tape fast run mode.

27. A tape recorder according to claim 25, wherein said control means causes the second or third driving means to rotate the second or third rotor magnet at the higher speed in a Fast Forward mode and a Rewind mode of the tape fast run mode.

* * * * *